(12) United States Patent
David et al.

(10) Patent No.: US 9,281,664 B2
(45) Date of Patent: Mar. 8, 2016

(54) ACCESS DOORS

(71) Applicant: LES INDUSTRIES CENDREX INC., Montreal (CA)

(72) Inventors: Sylvain David, St-Joseph-du-Lac (CA); Annie Larouche, Mascouche (CA); Jean Robichaud, Blainville (CA)

(73) Assignee: Les Industries Cendrex Inc., Montreal (CA)

( * ) Notice: Subject to any disclaimer, the term of this patent is extended or adjusted under 35 U.S.C. 154(b) by 196 days.

(21) Appl. No.: 13/659,164

(22) Filed: Oct. 24, 2012

(65) Prior Publication Data

US 2013/0104491 A1    May 2, 2013

Related U.S. Application Data

(60) Provisional application No. 61/552,693, filed on Oct. 28, 2011.

(51) Int. Cl.
*H02B 1/01* (2006.01)
*E04F 19/08* (2006.01)

(52) U.S. Cl.
CPC ................ *H02B 1/014* (2013.01); *E04F 19/08* (2013.01); *E04F 19/086* (2013.01); *Y10T 403/32451* (2015.01)

(58) Field of Classification Search
CPC ......... F16B 12/46; F16B 12/52; H02B 1/014; Y10T 403/32434; Y10T 403/32451; Y10T 403/606; E04F 19/08; E04F 19/086
USPC ............ 52/656.1, 656.2, 656.4, 656.5, 656.9, 52/204.1, 205, 210, 211, 217, 19, 20; 403/205, 230, 403; 49/501, 504, 505
See application file for complete search history.

(56) References Cited

U.S. PATENT DOCUMENTS 2,583,989 A * 1/1952 Bamberg ................... 52/800.14
2,727,596 A * 12/1955 Smith .............................. 49/463
3,451,153 A * 6/1969 Dohanyos ....................... 40/741

(Continued)

FOREIGN PATENT DOCUMENTS

DE         3523738 A1    1/1987
DE        19527547 A1    2/1996

(Continued)

OTHER PUBLICATIONS

International Search Report of the co-pending application PCT/CA2012/050757.

*Primary Examiner* — Ryan Kwiecinski
*Assistant Examiner* — Alp Akbasli
(74) *Attorney, Agent, or Firm* — Goudreau Gage Dubuc; Gwendoline Bruneau

(57) ABSTRACT

An access door adjustable to an opening, comprising a frame adjustable to the width and the height of the opening; and a door panel, the frame comprising side members and corner members; each side member having a section adapted to receive an edge of the opening and comprising a first part adapted to lay flat on an outer surface of the edge of the opening and a second part extending within the opening and comprising engagement positions, the engagement positions being adapted to engage the corner members between a maximum length for each side of the frame by using outermost engagement positions and a minimum length for each side of the frame, depending on the size of the opening, the frame receiving the door panel for closing the opening.

12 Claims, 23 Drawing Sheets

(56) References Cited

U.S. PATENT DOCUMENTS

| | | | | |
|---|---|---|---|---|
| 3,571,995 | A * | 3/1971 | Kasprzak | 52/212 |
| 3,769,772 | A * | 11/1973 | Oetiker | 52/646 |
| 3,866,380 | A * | 2/1975 | Benson | 52/656.6 |
| 4,222,209 | A * | 9/1980 | Peterson | 52/172 |
| 4,347,015 | A * | 8/1982 | Olashaw | 403/219 |
| 4,683,634 | A * | 8/1987 | Cole | 29/412 |
| 5,671,580 | A | 9/1997 | Chou | |
| 7,104,024 | B1 * | 9/2006 | diGirolamo et al. | 52/710 |
| 7,146,774 | B2 | 12/2006 | Fredette | |
| 7,364,243 | B2 * | 4/2008 | Wyatt et al. | 312/265.4 |
| 8,424,691 | B2 * | 4/2013 | McMillan et al. | 211/26 |
| 8,555,592 | B2 * | 10/2013 | Daudet et al. | 52/489.1 |
| 8,590,255 | B2 * | 11/2013 | Daudet et al. | 52/655.1 |
| 2003/0214205 | A1 * | 11/2003 | Wyatt et al. | 312/265.4 |
| 2004/0250475 | A1 * | 12/2004 | Seaman | 49/501 |
| 2010/0223857 | A1 * | 9/2010 | Sutton et al. | 52/27 |
| 2011/0138718 | A1 * | 6/2011 | Yeremian | 52/217 |
| 2013/0069501 | A1 * | 3/2013 | Liu | 312/223.1 |

FOREIGN PATENT DOCUMENTS

| | | |
|---|---|---|
| EP | 0060395 A1 | 12/1984 |
| FR | 2505921 A1 | 11/1982 |
| GB | 492538 | 9/1938 |
| GB | 2090641 | 7/1982 |
| GB | 2313609 A | 12/1997 |

* cited by examiner

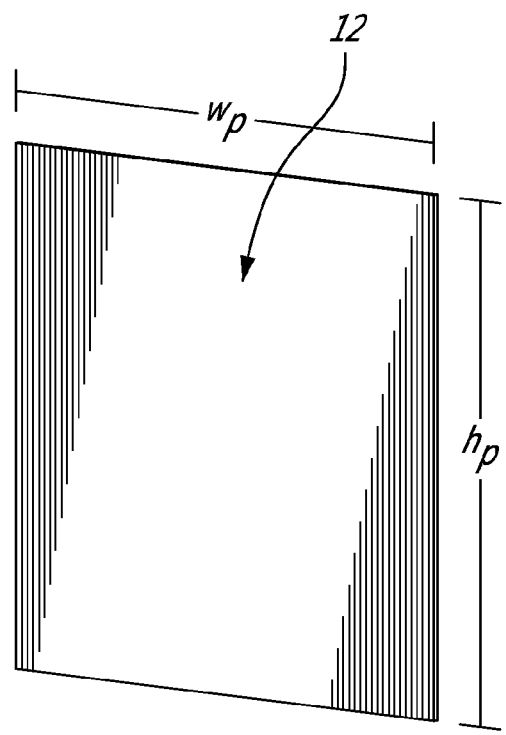
_FIG_1a
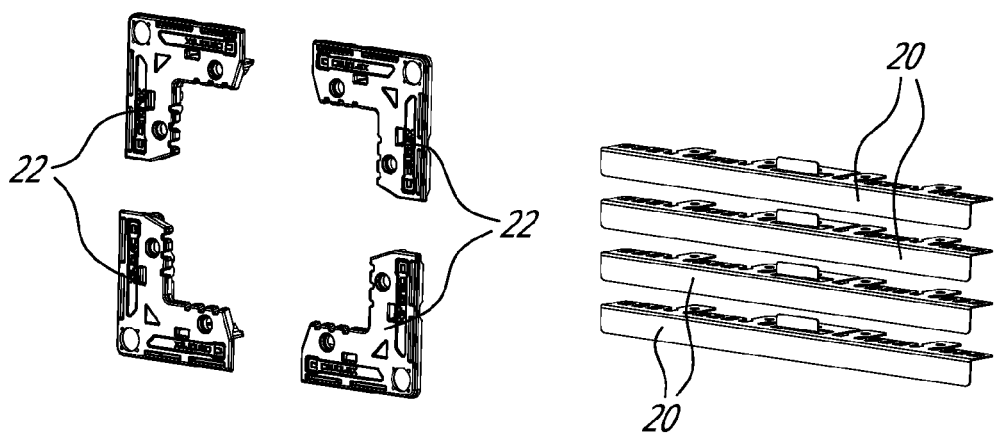
_FIG_1b    _FIG_1c

|  | min/Min | Inch / Pouce / Plug | | | max/Max |
|---|---|---|---|---|---|
|  | A | B | C | D | E |
| 6X7.5 | 6" | 6.375" | 6.75" | 7.125" | 7.5 |
| 8X9.5 | 8" | 8.375" | 8.75" | 9.125" | 9.5 |
| 10X11.5 | 10" | 1.375" | 10.75" | 11.125" | 11.5 |
| 12X13.5 | 12" | 12.375" | 12.75" | 13.125" | 13.5 |
| 14X15.5 | 14" | 14.375" | 14.75" | 15.125" | 15.5 |

FIG-9a

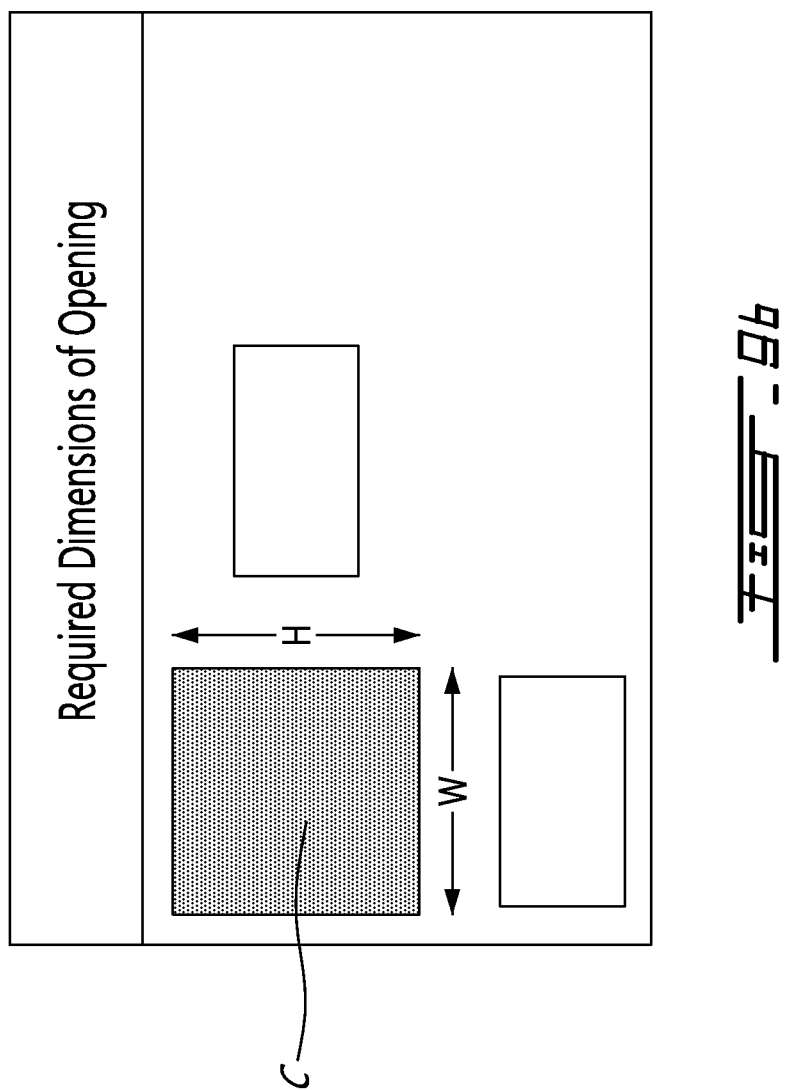

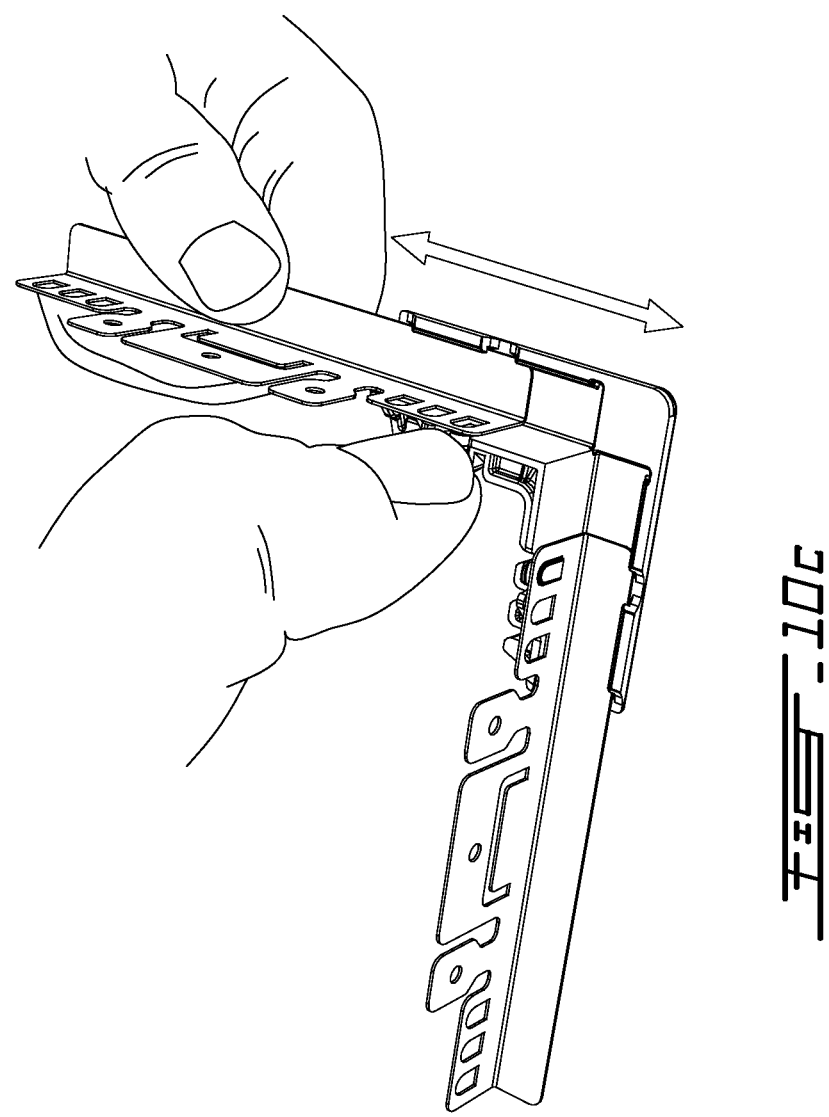

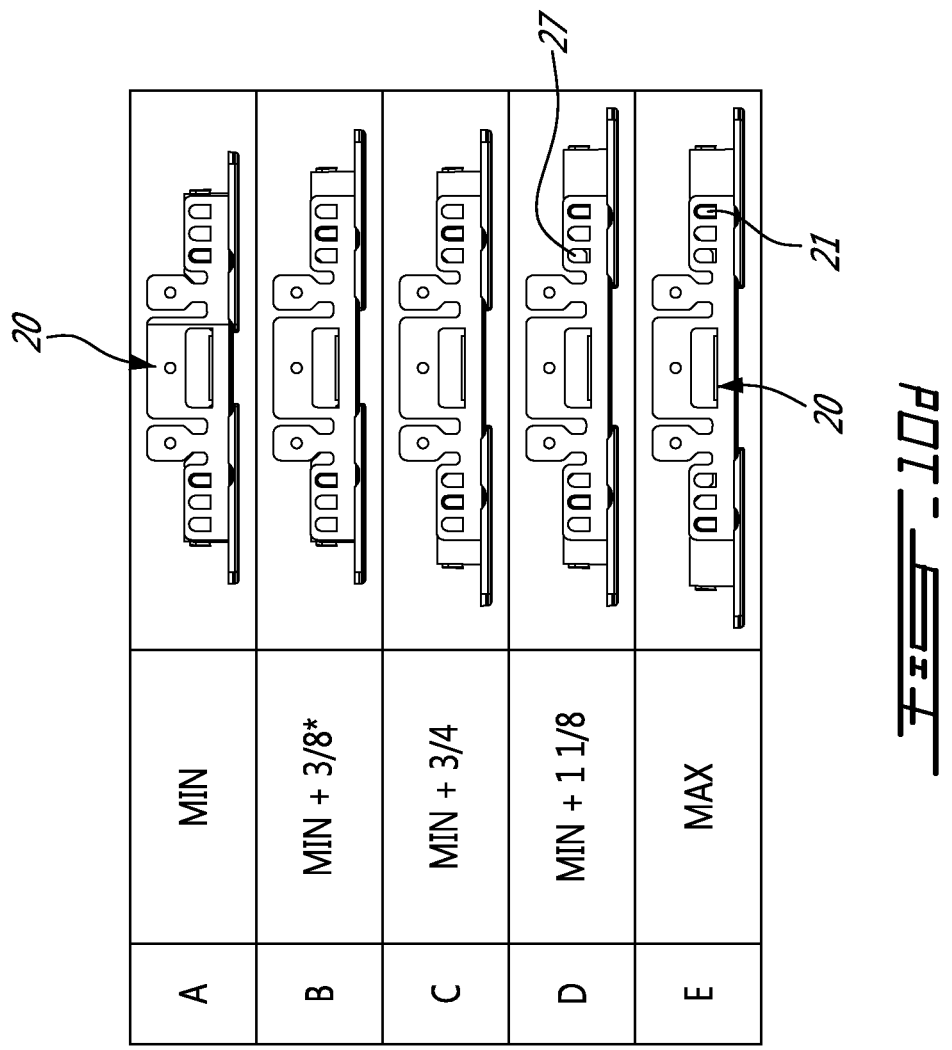

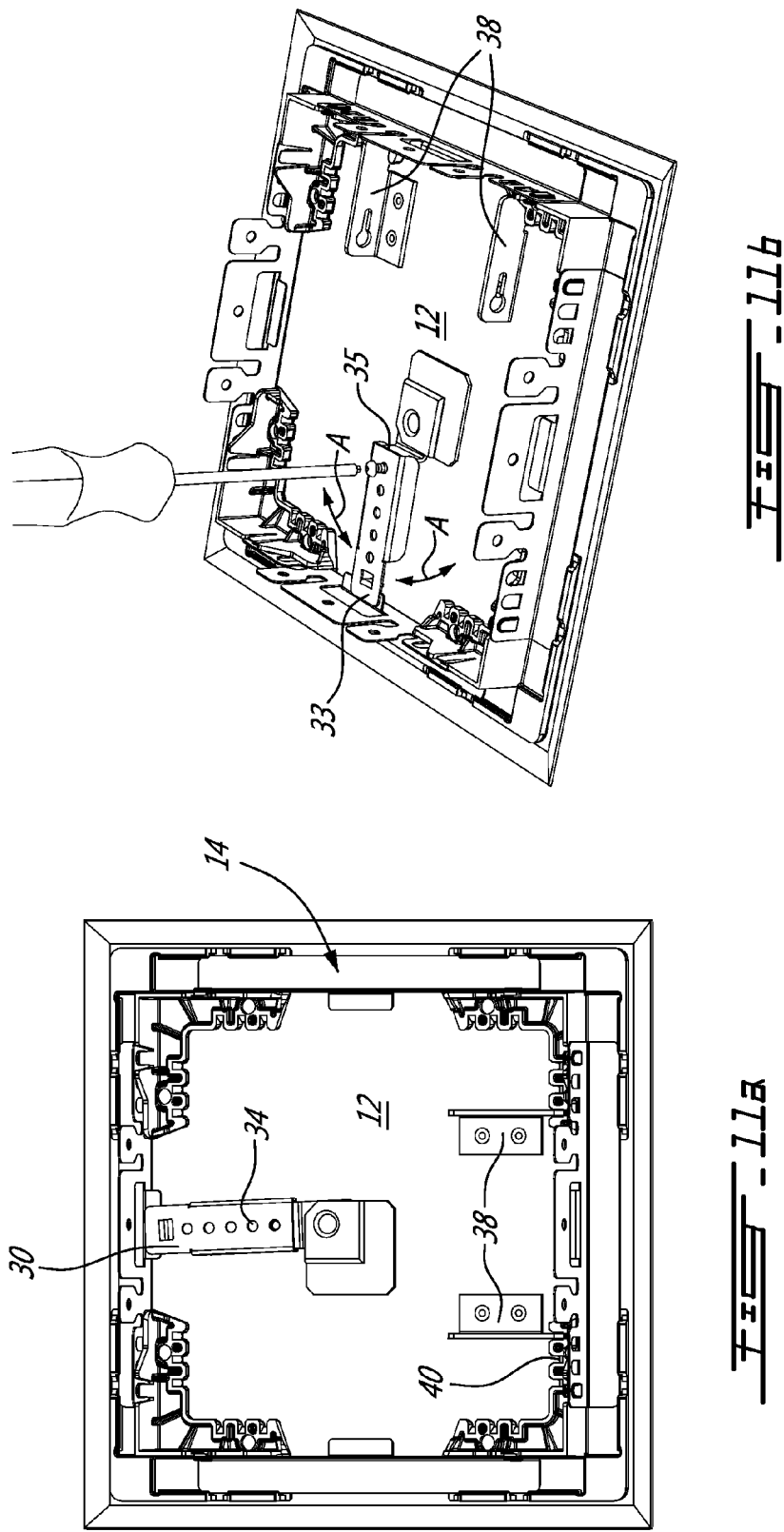

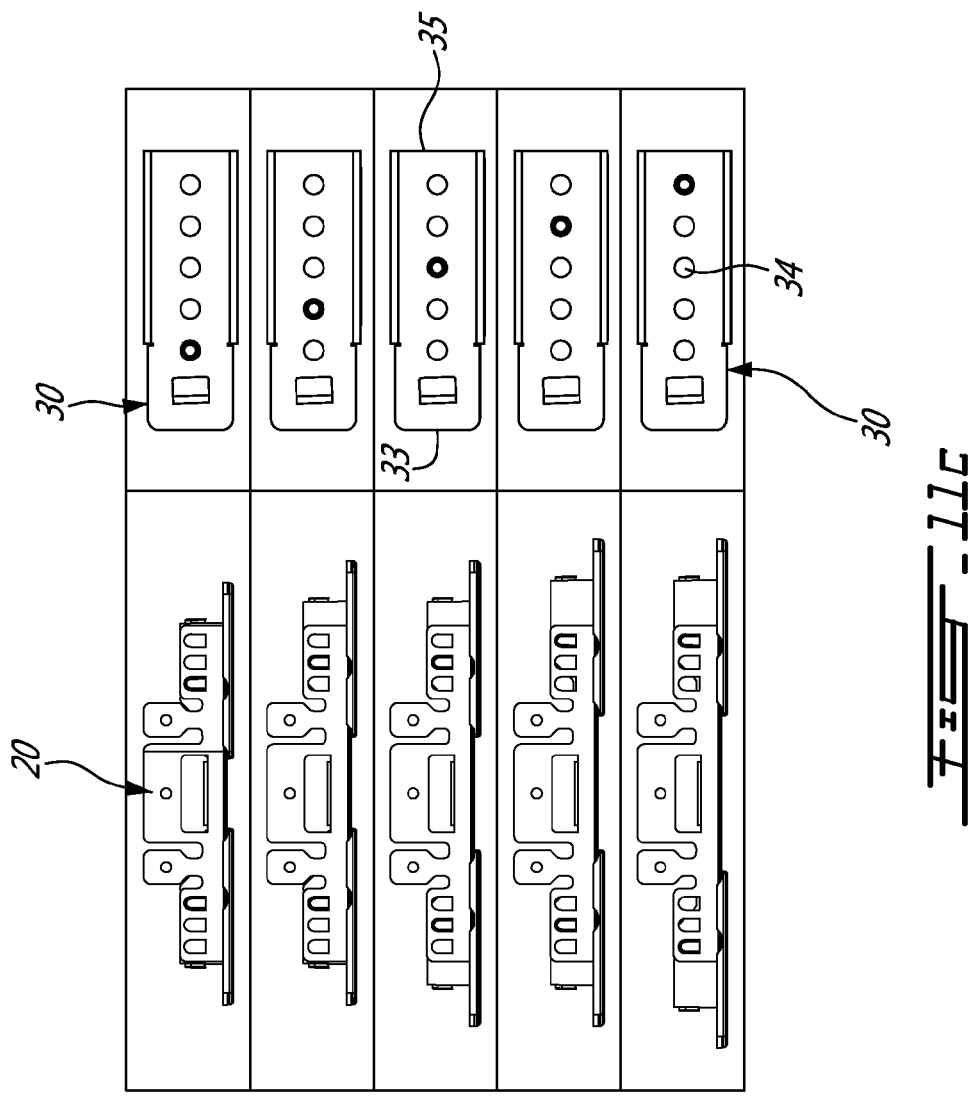

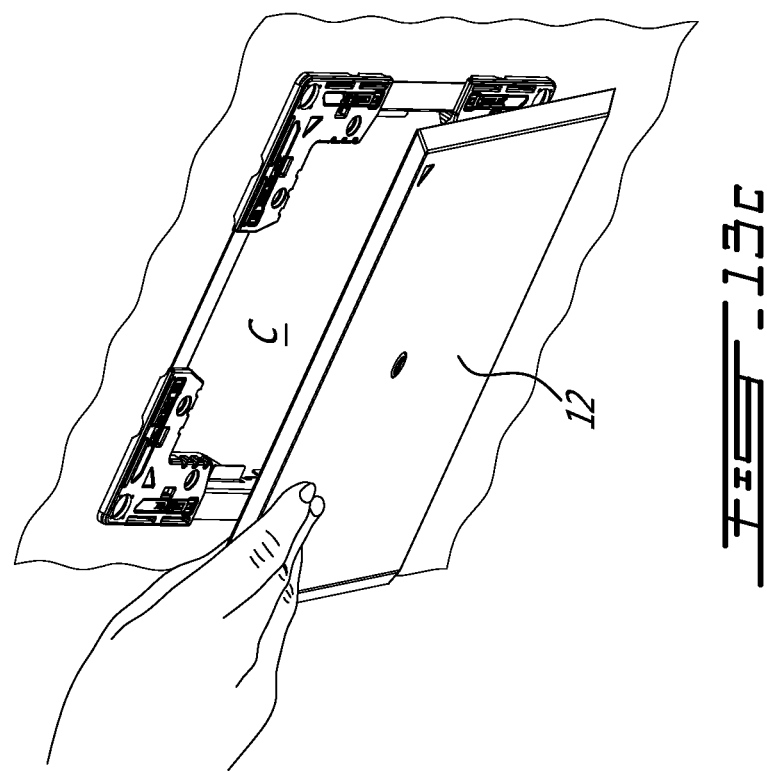

ACCESS DOORS

CROSS REFERENCE TO RELATED APPLICATIONS

This application claims benefit of U.S. provisional application Ser. No. 61/552,693, filed on Oct. 28, 2011. All documents above are incorporated herein in their entirety by reference.

FIELD OF THE INVENTION

The present invention relates to adjustable frames and access doors.

BACKGROUND OF THE INVENTION

Access doors are used to allow an easy and clean access to walls and ceilings, floor and roof hatches, for maintenance or repair purposes for example.

Conventional access doors comprise a rigid frame secured to a door by hinges, and the frame needs to be nailed about an opening in the wall, ceiling or floor.

There is still a need in the art for adjustable frames and access doors.

SUMMARY OF THE INVENTION

More specifically, in accordance with the present invention, there is provided an access door adjustable to an opening having a size defined by a width and a height, comprising a frame adjustable to the width and the height of the opening; and a door panel, of a size at least the size of the opening, wherein the frame comprises side members and corner members; each side member having a section adapted to receive an edge of the opening and comprising a first part adapted to lay flat on an outer surface of the edge of the opening and a second part extending within the opening, the second part comprising engagement positions along a length thereof, the engagement positions being adapted to engage the corner members between a maximum length for each side of the frame by using outermost engagement positions along the length of the side member on each side of the side member and a minimum length for each side of the frame by using innermost engagement positions on each side of the side member, depending on the size of the opening, the frame receiving the door panel for closing the opening.

There is further provided a method for closing an opening having relatively straight edges in a panel, comprising: a) aligning a first side member and a first corner member, the side member comprising a first part and a second part, the second part comprising engagement positions; b) engaging one of the engagement positions of the side member with the corner member based on the size of the opening, and snapping the corner member and the side member together; c) repeating steps a) and b) with a second, third and fourth side members and a second, third and fourth corner members to form a frame of the size of the opening; d) positioning the frame within the opening, the corners members fitting with the corners of the opening, the first part of each side member sitting on an outer surface of the edge of the opening, and the second part of each side member extending into the opening; e) aligning at least one glide provided on an inner surface of a door panel with a notch of at least one corner member based on the size of the frame and engaging a distal end of the glide in the notch; and f) moving the door panel against the frame.

There is further provided a frame for an opening, comprising sides having a section adapted to receive an edge of the opening and comprising a first part adapted to lay flat on an outer surface of the edge of the opening, and a second part extending within the opening; the second part comprising positioning slots; and corners, each corner comprising two arms at a substantially right angle, each arm comprising a positioning pin adapted to engage a positioning slot of a side; wherein the sides are connected two by two by the corners by selecting a positioning slot of the sides for engagement by the positioning pin based on a size of the opening.

There is further provided a method for adjusting a frame about an opening, comprising: a) aligning a first side member and a first corner member, the side member comprising a first part and a second part, the second part comprising positioning slots; and the corner member comprising two arms each having a positioning pin; b) engaging a positioning slot of the side member with the positioning pin of an arm of the corner member based on the size of the opening, and snapping the corner member and the side member together; and c) repeating steps a) and b) with a second, third and fourth side members and a second, third and fourth corner members to form a frame.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 1 show a) a door panel, b) corners, c) sides of a frame.

FIG. 9 show a set of side members according to an embodiment of an aspect of the present invention;

FIGS. 11a)-c) show steps for assembling a locking mechanism onto a door panel of an access door according to an embodiment of an aspect of the present invention;

DESCRIPTION OF EMBODIMENTS OF THE INVENTION

Figure 1D:
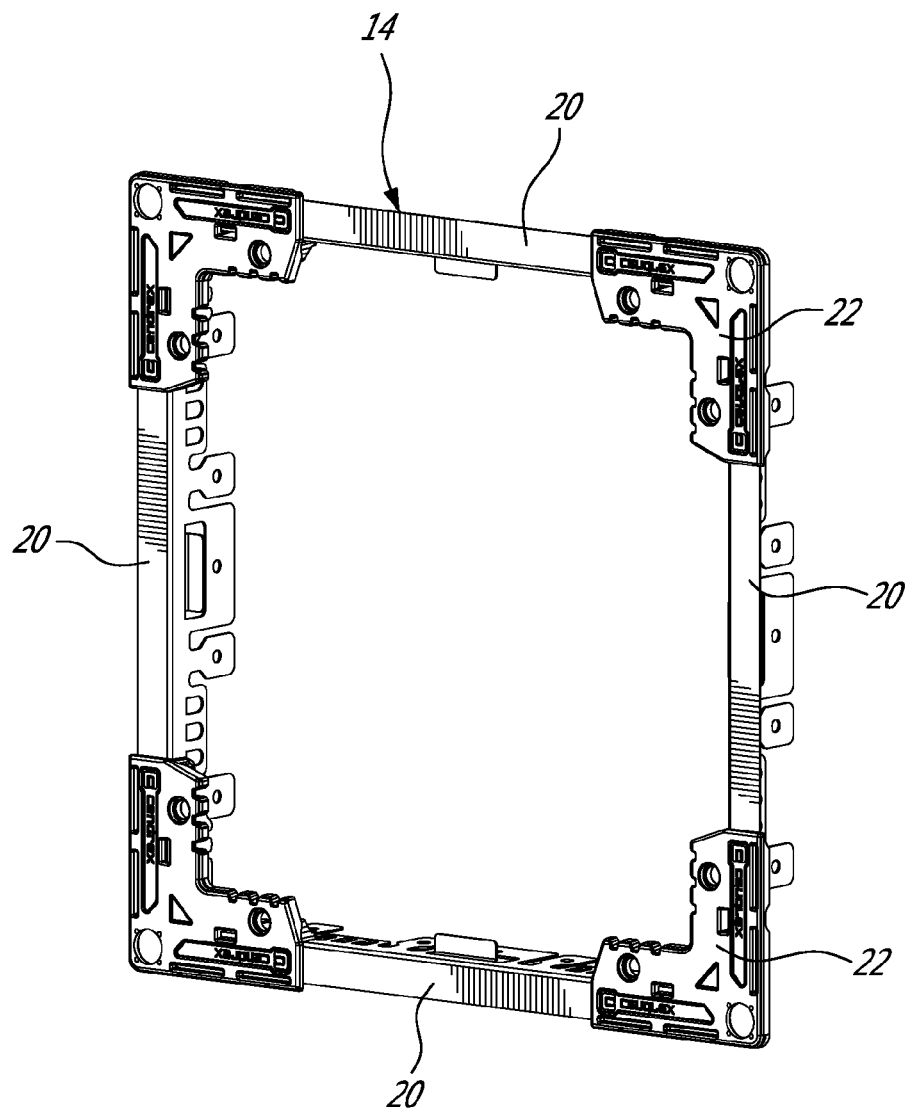
FIG. 1d shows an assembled frame according to an embodiment of an aspect of the present invention.

According to an embodiment of an aspect of the present invention, an adjustable frame 14, shown assembled in FIG. 1d, comprises side members 20 (see FIG. 1c) connected two by two by corner members 22 (see FIG. 1b). The side members 20 may be metallic members and the corners 22 plastic members for example. Other materials may be used.

Figure 2:
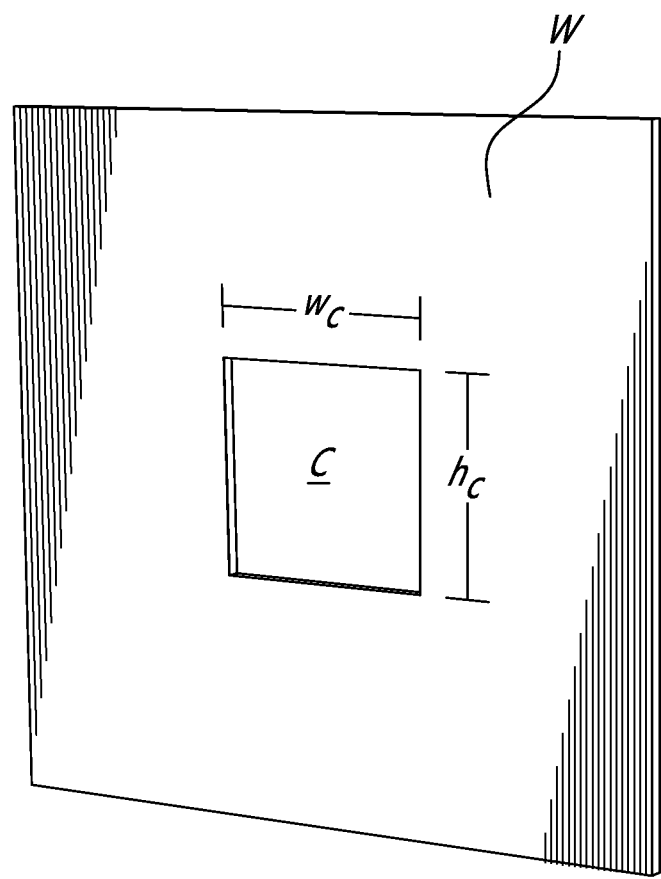
FIG. 2 shows an opening in a wall, ceiling or floor panel.

The side members 20 are rigid members which, by interaction with the corners 22, adjust to a desired frame size. In the case of a frame for an opening (C) in a panel (W) as shown in FIG. 2 for example, the corners members 22 adapt to the corners of the opening (C), and the side members 20 adjust to the length and thickness of the edges of the opening (C) as will be discussed hereinbelow.

FIGS. 3-6 illustrate embodiments of side members 20 having a L section (see FIGS. 3c, 4c, 5c, and 6c), and comprising a first part 22a adapted to sit flat on the outer surface, i.e. the visible surface, of the edge of an opening, and a second part 22b adapted to extend within the opening and comprising foldable tabs 24 and positioning slots 27 along its length. The L section provides protecting the material on the edge on the perimeter of the opening (C), with the tabs 24 being foldable inside the opening against the inner surface, i.e. behind the wall, ceiling or floor panel, of the edge of the opening thereby maintaining the side member 20 about the opening, as will be described hereinbelow. The positioning slots 27 provide different positions for securing the side member to two corner members on each side thereof, as will be described hereinbelow, between a maximum length for a side by using the outermost positioning slots 27o along the length of the side member on each side of the side member, for engagement with the corner members, and a minimum length for a side by using the inner most positioning slots 27i on each side of the side member, for engagement with the corner members.

Figure 7A:
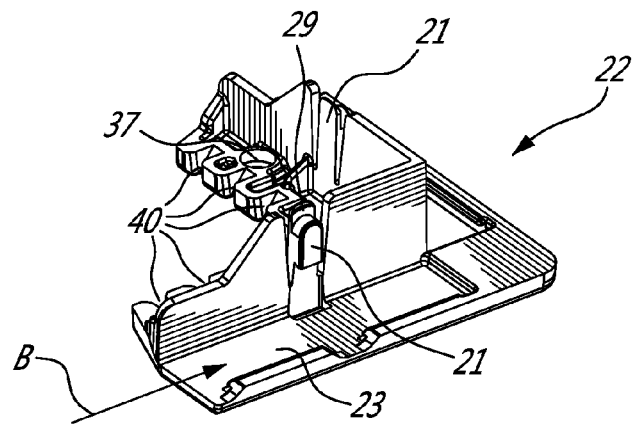
FIG. 7 show a) a perspective view of the inner surface, b) the outer surface, and c) a side view, of a corner member of a frame according to an embodiment of an aspect of the present invention.
Figure 7B:
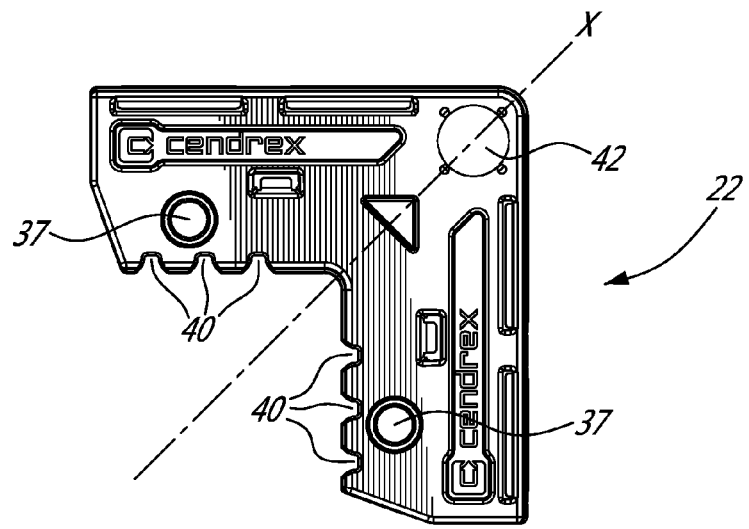
Figure 7C:
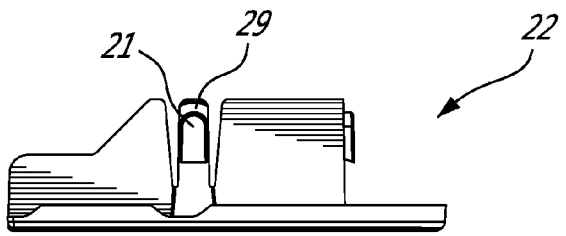

In FIG. 7, a corner member 22 is shown as a symmetric element relative to an axis (X) shown in FIG. 7b, comprising two arms at a substantially right angle, each arm adapted to connect with an extremity of a side member. Each arm comprises a positioning pin 21 on an inner surface, i.e. the surface directed towards the opening (best seen FIGS. 7a and 7c) and notches 40 on the inner edge of each arm (best seen in FIG. 7b). In the illustration of FIG. 7a, each positioning pin 21 extends perpendicularly from the inner surface of the corner member, at a distance from the outer edge of the corner member occupied by a surface 23 adapted to slidingly receive a part 22a of a side member 20 as will be discussed hereinbelow. Moreover, the positioning pin 21 may be provided with a detent 29 for easy access to the positioning pin 21, once the part 22b of a side member 20 is snapped thereto, as discussed hereinbelow. It may also comprise an embedded magnet 42, or other element adapted to retain a door panel, as will be discussed hereinbelow. Apertures 37, or other feature for securing a cable, may further be provided on each arm, as will be discussed hereinbelow.

The positioning pin 21 of each arm of a corner member 22 is adapted to receive a positioning slot 27 of a respective side member 20 to adapt to the size of the opening (C) as will be described hereinbelow in relation to FIGS. 9 and 10 for example.

Figure 3A:
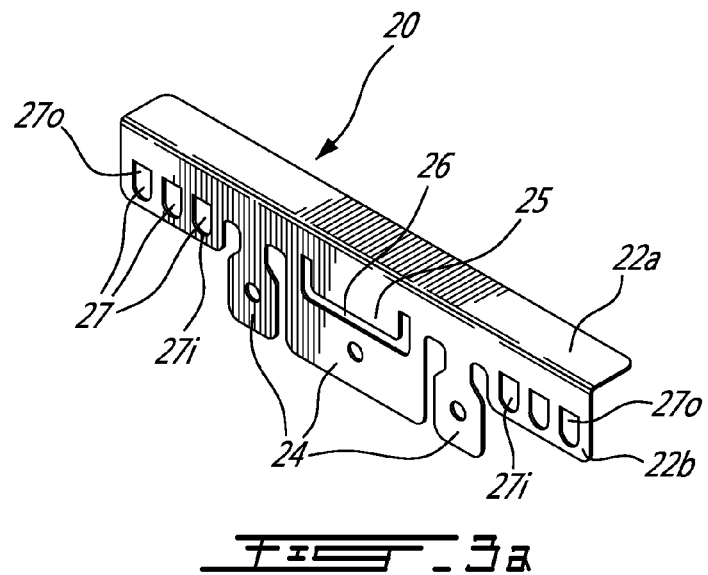
FIG. 3 show a) a perspective view, b) a side view, and c) a cross section view of a side member of a frame according to an embodiment of an aspect of the present invention.
Figure 3B:
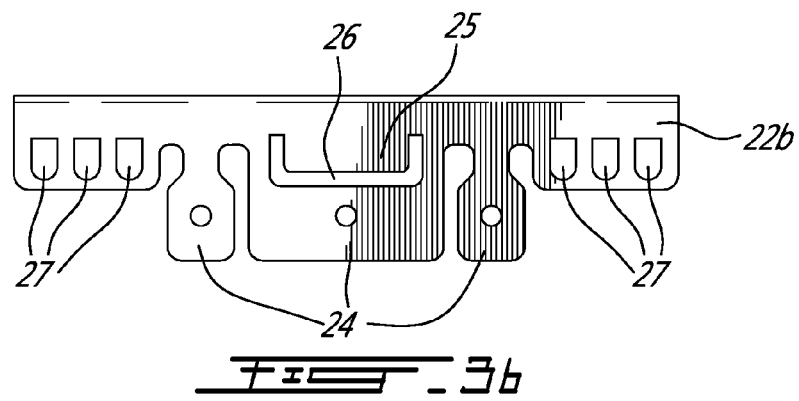
Figure 3C:
Figure 4A:
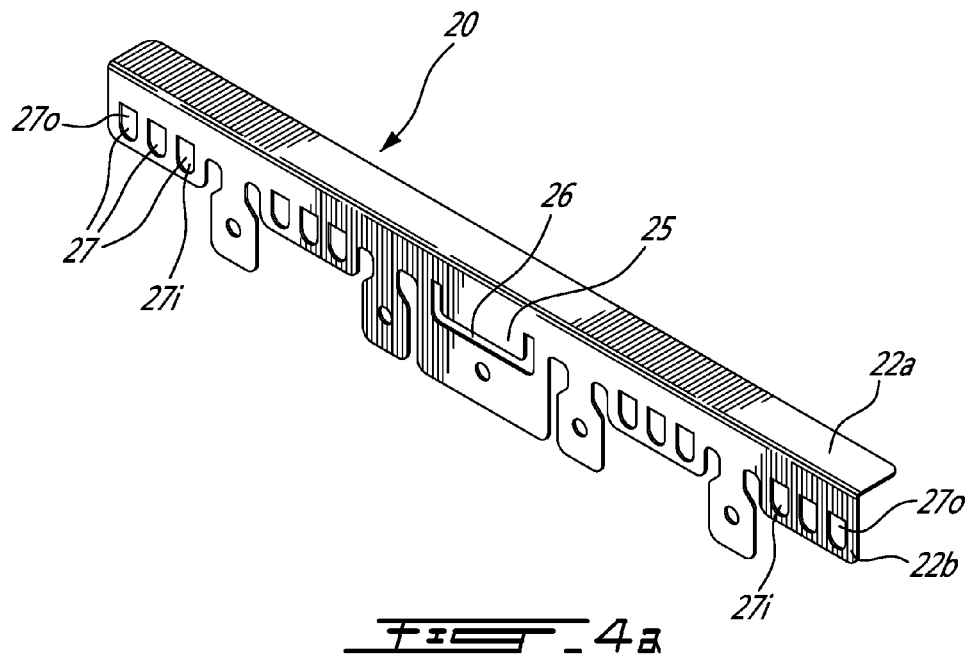
FIG. 4 show a) a perspective view, b) a side view, and c) a cross section view of a side member of a frame according to an embodiment of an aspect of the present invention.
Figure 4B:
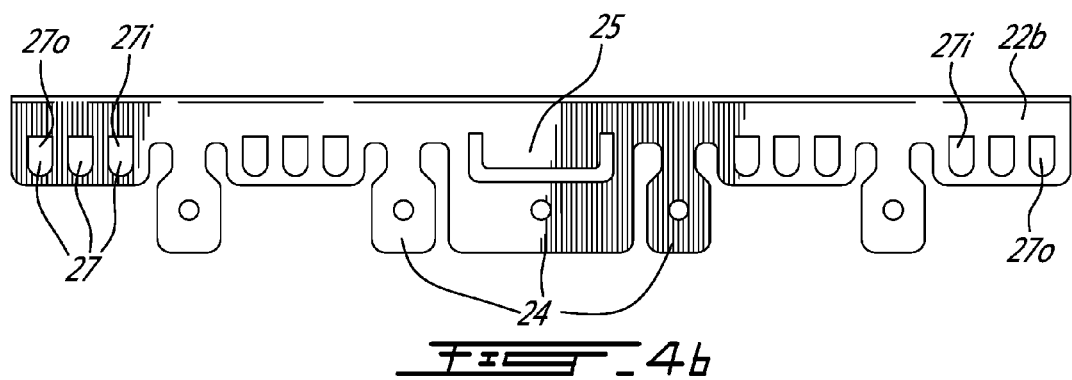
Figure 4C:
Figure 5A:
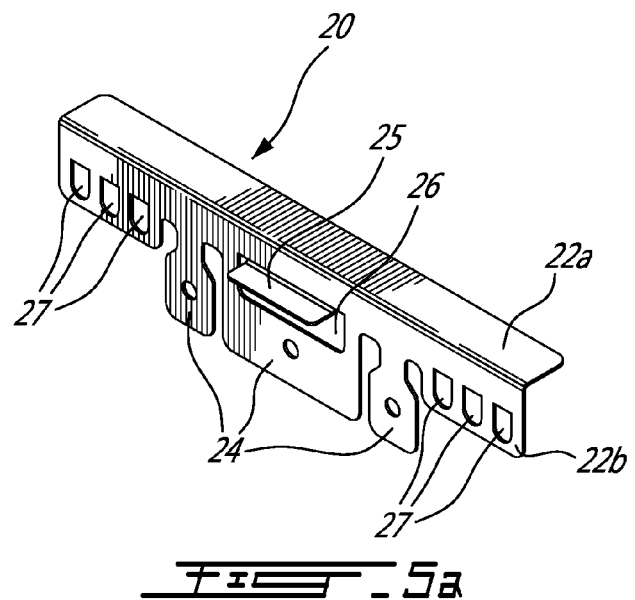
FIG. 5 show a) a perspective view, b) a side view, and c) a cross section view of a side member of a frame according to an embodiment of an aspect of the present invention.
Figure 5B:
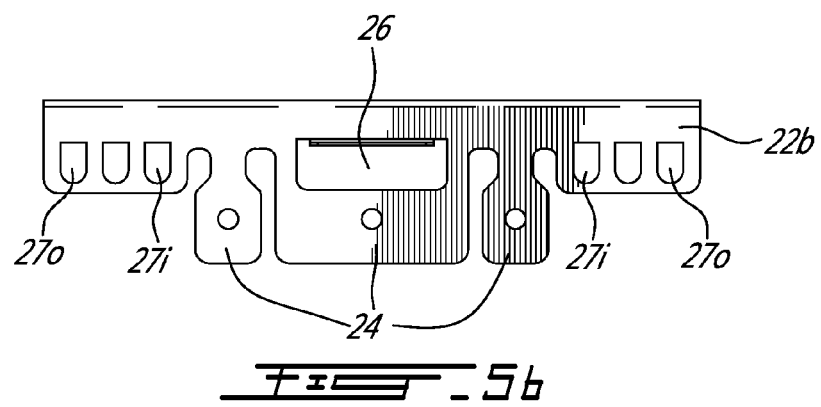
Figure 5C:
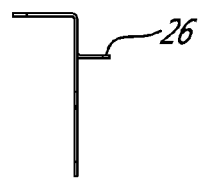
Figure 6A:
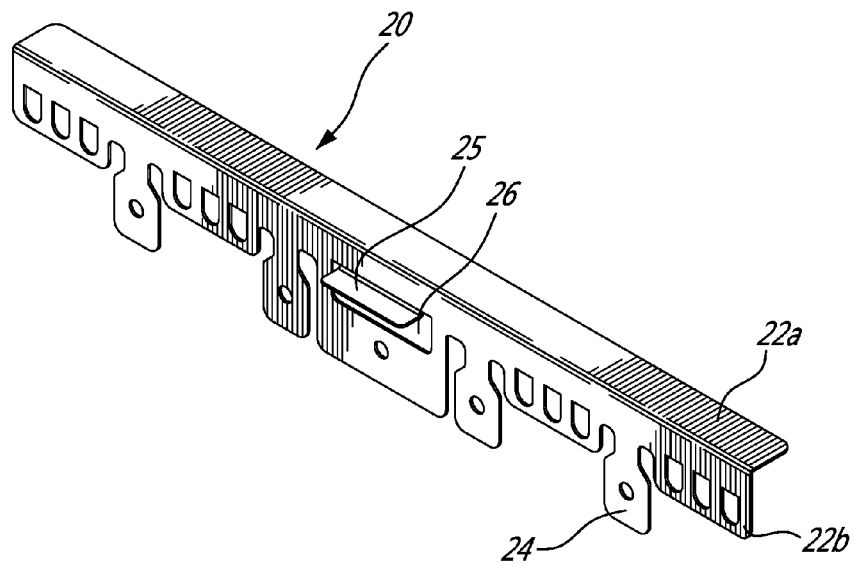
FIG. 6 show a) a perspective view, b) a side view, and c) a cross section view of a side member of a frame according to an embodiment of an aspect of the present invention.
Figure 6B:
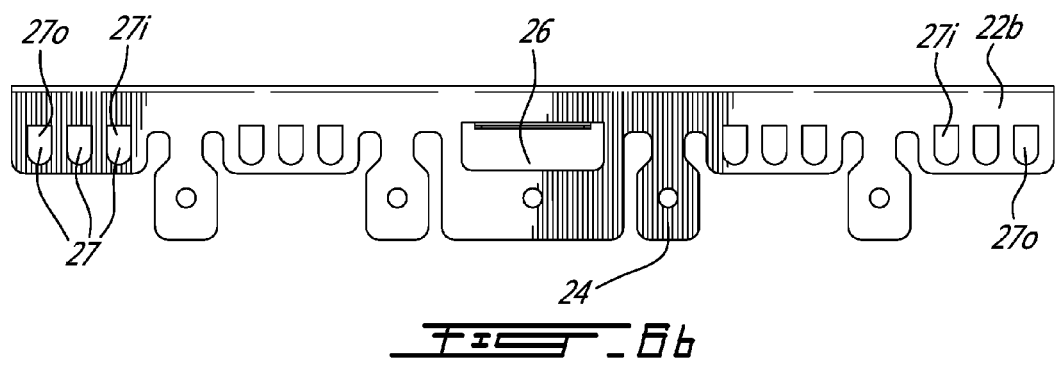
Figure 6C:
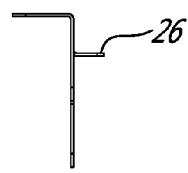

The side member 20 may also comprise a locking slot 26. In FIGS. 3 and 4, the locking slot 26 is shown covered by a tab 25, while in FIGS. 5 and 6 the locking slot 26 is shown with the tab 25 folded away, so that the locking slot 26 is adapted to receive a lock 30 as will be described hereinbelow in relation to FIG. 11.

An access door basically comprises a frame (FIG. 1d) supporting a door panel (FIG. 1a) used to cover an opening (C), into a panel (W), such as a wall, a ceiling or a floor panel for example (FIG. 2). The opening (C) has a width $w_0$ and a height $h_0$.

The door panel 12 may be metallic for example, or in other rigid material, such as wood, board or plastic for example. The door panel is of a generally rectangular or square shape, with a width $w_p$ and a height $h_p$, of a size at least the size of the opening to be covered: i.e. $w_p$ is at least equal to $w_c$ and $h_p$ is at least equal to $h_c$.

According to an embodiment of the present invention, the door panel 12 comprises at least one glide, two glides 38 being shown in FIGS. 11 and 13 for example, on its inner surface, i.e. its surface intended to be facing the opening. As shown in FIG. 14, a glide 38 comprises a part 41 rising from the inner surface of the door panel 12 and having a distal end 43. As will be described hereinbelow in relation to FIG. 13, a glide 38 ensures centering of the door panel 12 relative to the frame 14 by engaging a corner member. Depending on the size of the frame 14, the distal end 43 of the glide 38 engages a corresponding notch 40 of a corner member 22, thereby securing the door panel 12 to the frame 14, and stabilizing the access door 14, once installed. The glide 38 may also comprise an attachment for a cable, such as an opening 39, shown in FIG. 14.

Figure 8A:
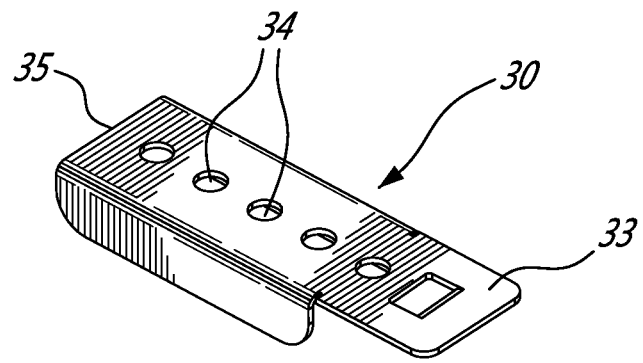
FIG. 8 show) a perspective view, b) a top view of a lock according to an embodiment of an aspect of the present invention.
Figure 8B:
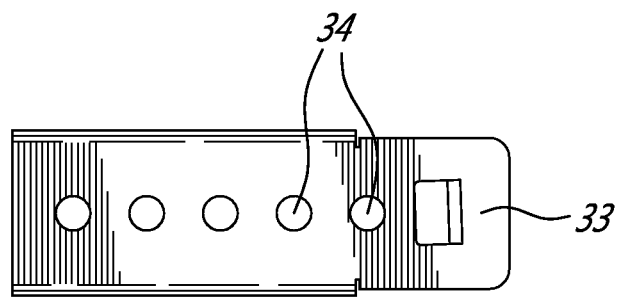

A locking mechanism may be provided, by positioning a lock 30 on the inner surface of the door panel 12. The lock 30 shown in FIG. 8 comprise a slot 33 at a distal end thereof and a series of holes 34 along its length allowing different locations, depending on the size of the frame 14, for securing the lock 30 to the door panel 12 by its proximal end 35 so that the distal end 33 can engage the locking slot 26 of a side member 22, as will be described hereinbelow in relation to FIG. 11.

For installation, no framing or construction is necessary provided the edges of the wall opening (C) are relatively straight, and square to each other for best fit, otherwise the door may be out of square when installed. The edges of the opening should also be square to surrounding walls, ceilings or floors to ensure that the frame and/or the access door look level when finished.

In an embodiment of the present invention, the frame 14 can be selected to fit the size $h_c$ and $w_c$ of the opening (C), in increments corresponding to the positions of the positioning slots 27 of the side members 22, for example in increments of ⅜" of an inch, between a minimum size and a maximum size for a given model depending on the positions of the connection between side members and corner members as described hereinabove (see FIG. 9), in width and/or height. The opening (C) can be square or rectangular in shape.

The panel door 12 can be painted or wallpapered to match the color or finish of the wall, ceiling or floor panel.

For assembling the frame 14, a side member 20 is aligned with an arm of a corner member 22, for example by sliding on the surface 23 in the embodiment illustrated in FIG. 7 (see arrow (B) in FIG. 7a), based on a required sizing (see FIG. 10d) so as to engage the positioning pin 21 on this arm of the corner member 22 into one of the positioning slots 27 of the side member 22 (FIGS. 10*a*-10*b*), and the corner member 22 and the side member 20 are then snapped together. A clicking sound indicates that they are connected. Once connected the two members can be easily disconnected, if necessary, for example by action with a finger on the detent 29 of the positioning pin 21 as illustrated in FIG. 7, and reconnected (see FIG. 10*c*). The remaining corners and sides are connected in the same way, so as to end up with a full frame 14 of a size adjusted to the size of the opening to be covered (see FIG. 1*b*).

Figure 10B:
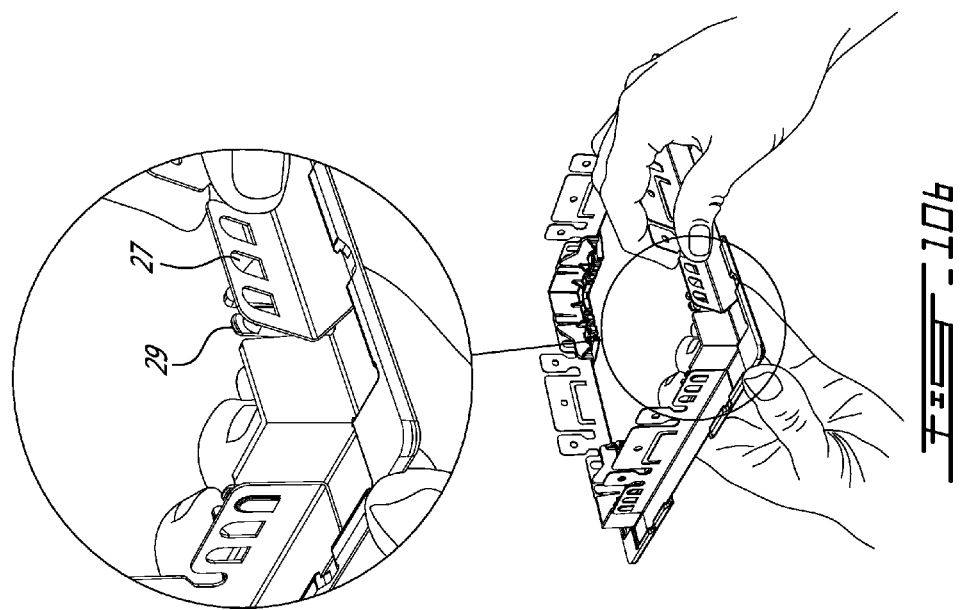
FIGS. 10a)-f) show steps for assembling a frame according to an embodiment of an aspect of the present invention.
Figure 10A:
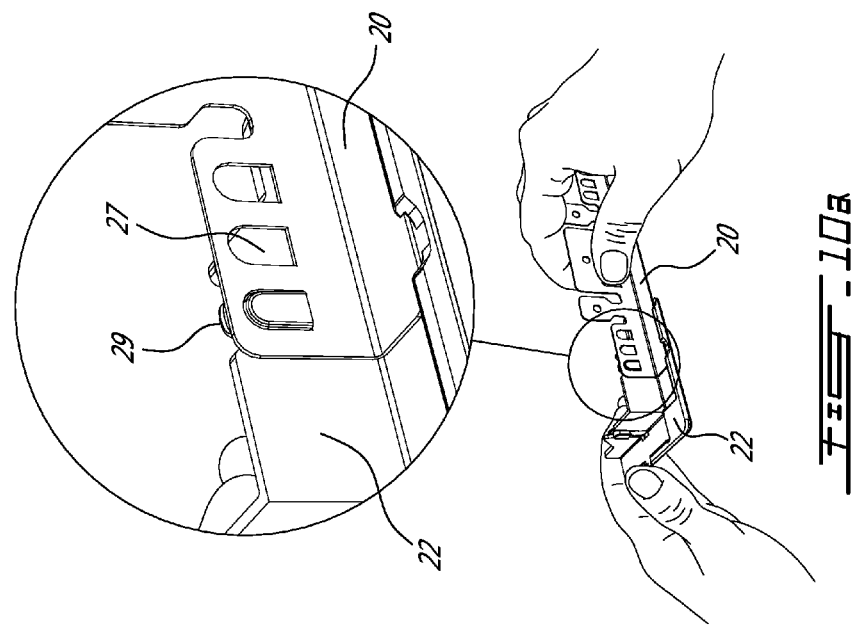
Figure 10F:
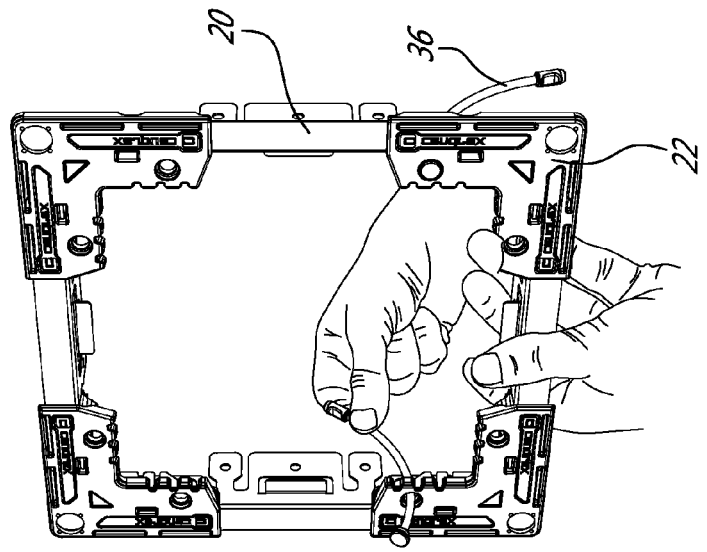
Figure 10E:
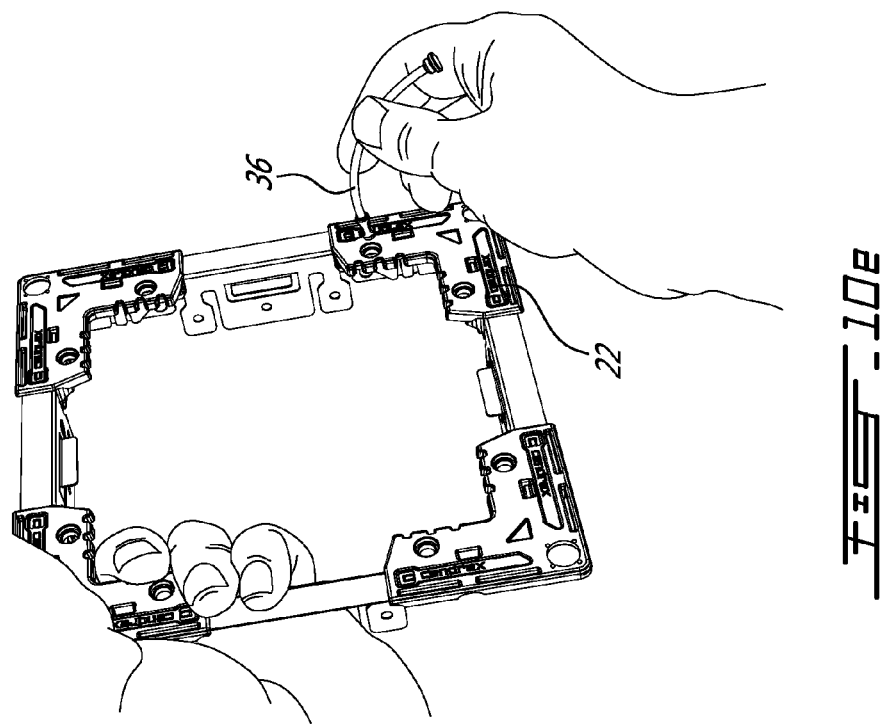

A safety cable 36 may be attached to at least one corner 22, by inserting the cable 36 through an opening 37 in an arm of the corner member 22 for example (FIGS. 10*e*-10*f*).

If using a locking mechanism, the door panel 12 is laid with its outer surface down and the frame 14 is put squarely into position (see FIG. 11) about its inner surface, in order to determine which hole 34 of the lock 30 is the correct distance for the proximal end 35 thereof to be fastened to the panel 12, so that the distal end 33 of the lock 30 is able to engage the frame 14 (see FIG. 11*c*). Then the lock 30 is fastened to the panel 12 with a screw for example through the corresponding hole 34 in the proximal end 35 (see FIG. 11*b*), so that it may rotate, about the screw position, from a locking position, in which the distal end 33 of the lock 30 engages the frame 14, to an unlocking position, in which the distal end 33 of the lock 30 is not connected to the frame 14 (see arrow A in FIG. 11*b*).

Figure 12B:
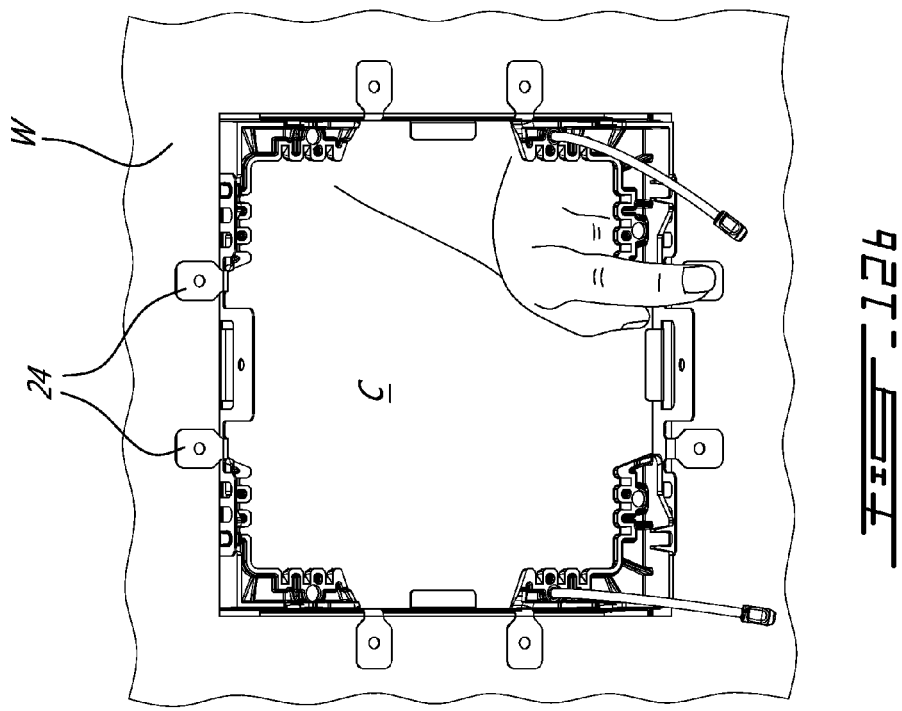
FIGS. 12a)-d) show steps for installation of an assembled frame in an opening according to an embodiment of an aspect of the present invention.
Figure 12A:
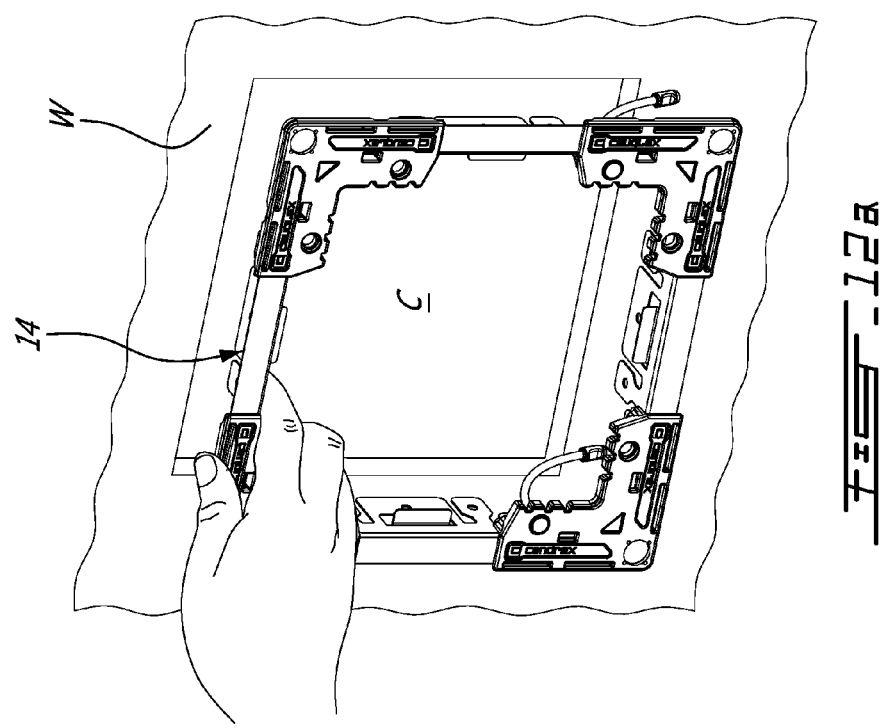
Figure 12C:
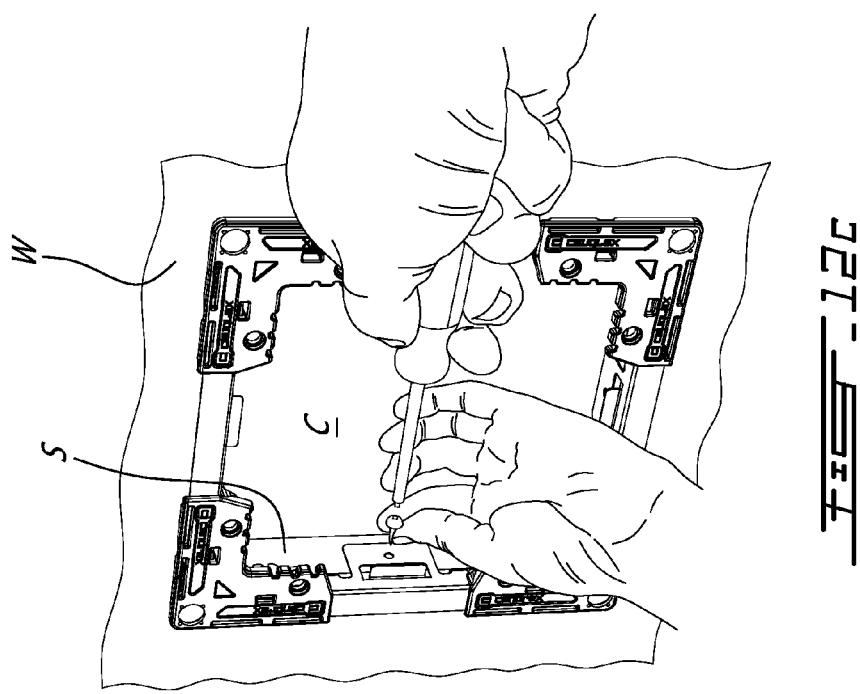
Figure 12D:
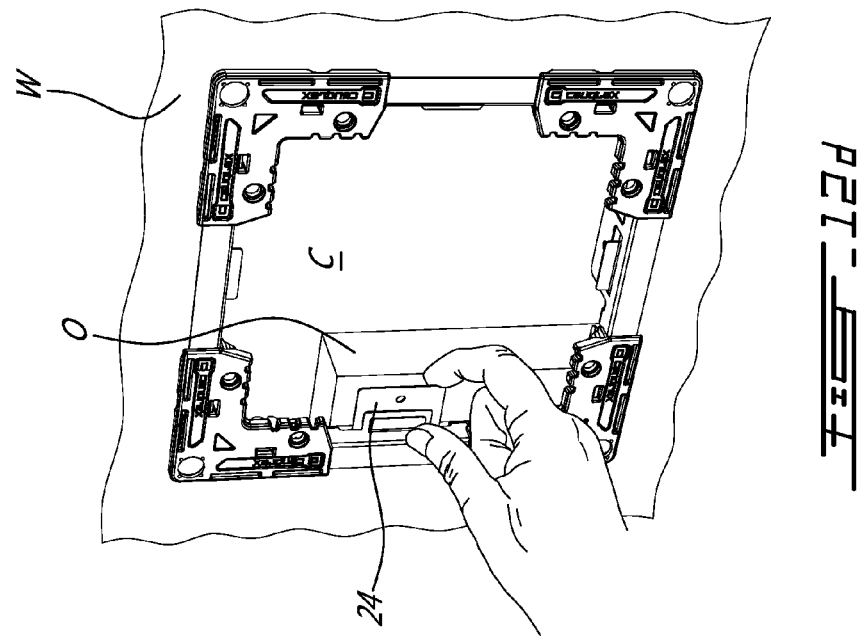

Then, as shown in FIG. 12, with or without a locking mechanism, the frame 14 is positioned within the opening (C) (FIG. 12*a*) and tabs 24 are folded behind the wall, ceiling or floor panel, to lock the frame 14 into place within the opening (FIG. 12*b*). If there is an obstacle (0) in the opening (C), tabs 24 may be bent outwards as needed (FIG. 12*d*). If there is a solid structure (S) present, the frame 14 can be screwed in to it through holes of the tabs 24 for example (FIG. 12*c*).

Figure 13B:
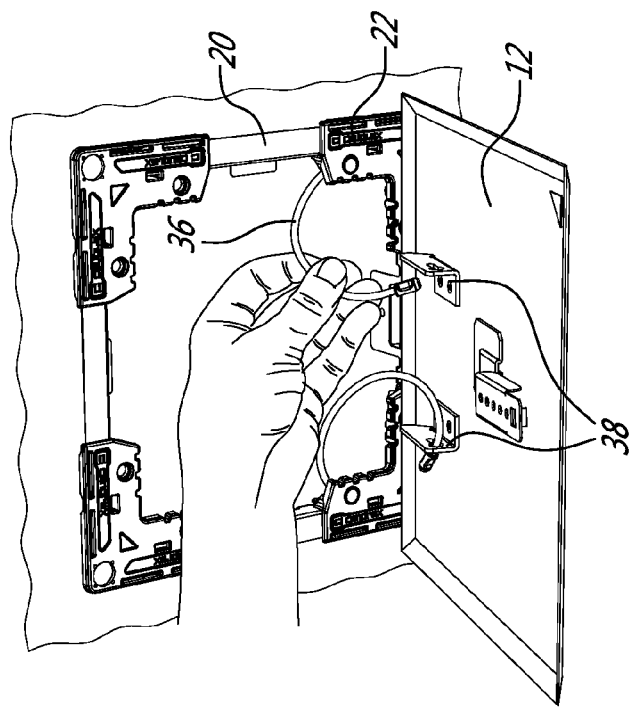
FIGS. 13a)-e) show steps for installing a door panel into an assembled frame according to an embodiment of an aspect of the present invention.
Figure 13A:
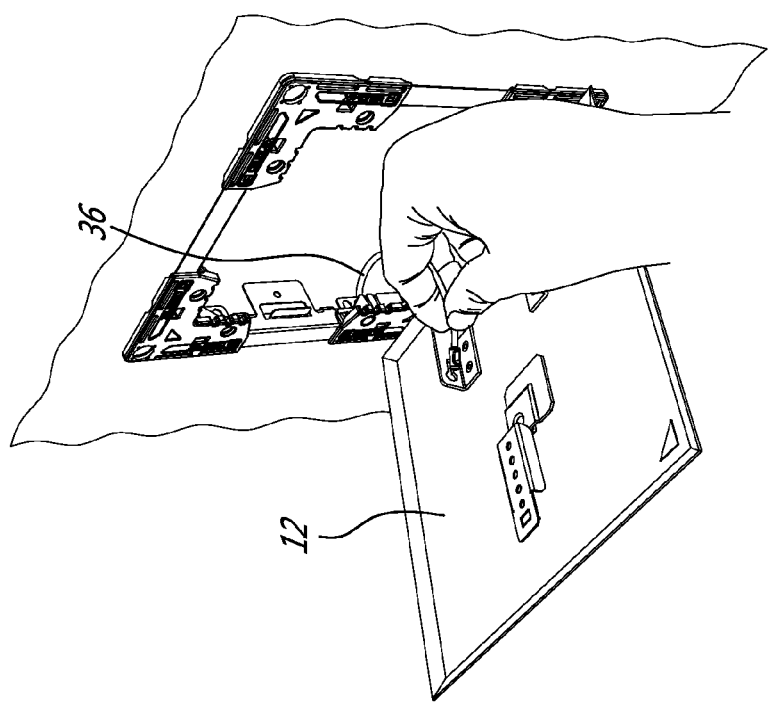
Figure 13A:
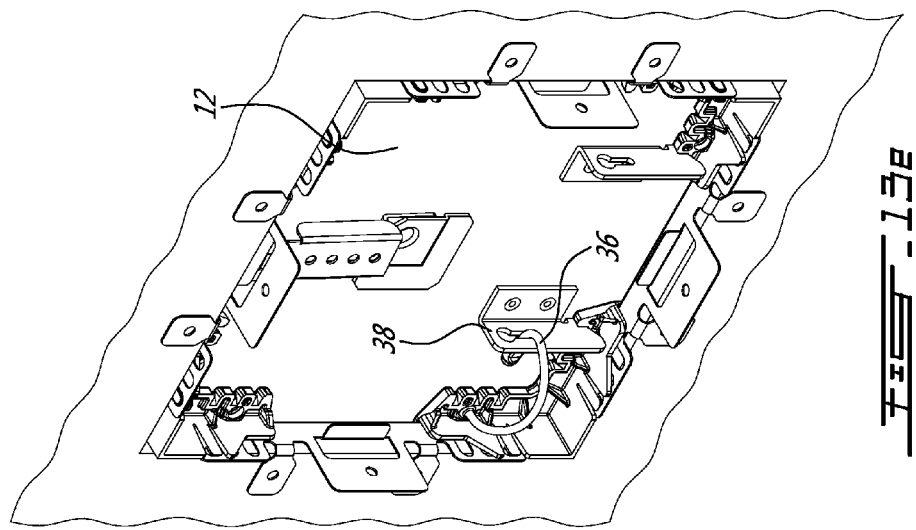
Figure 13B:
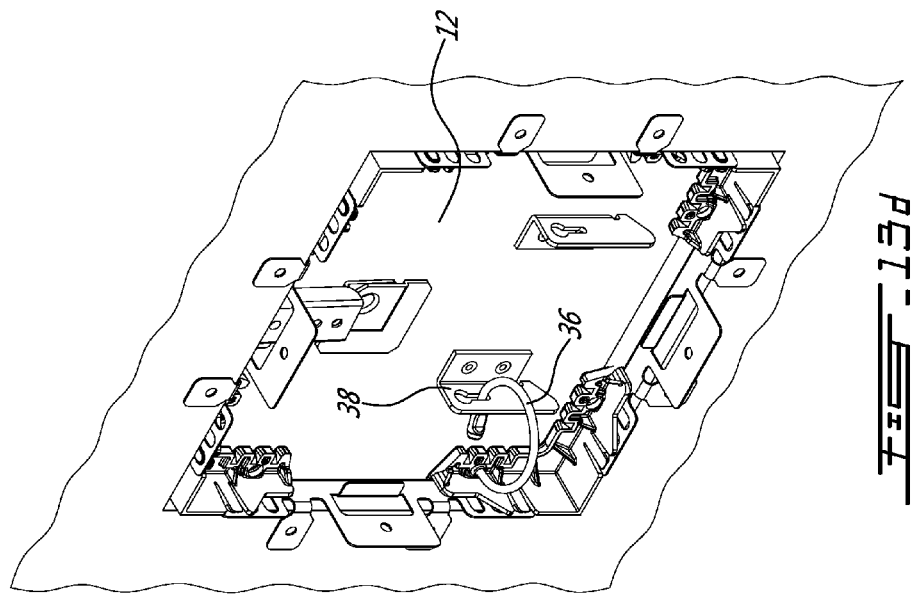
Figure 14A:
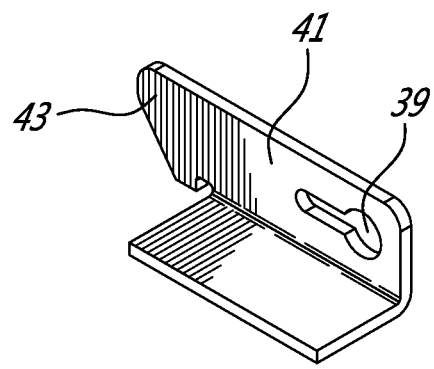
FIG. 14 show a) a perspective view and b) a side view of a glide for a door panel according to an embodiment of an aspect of the present invention.
Figure 14B:
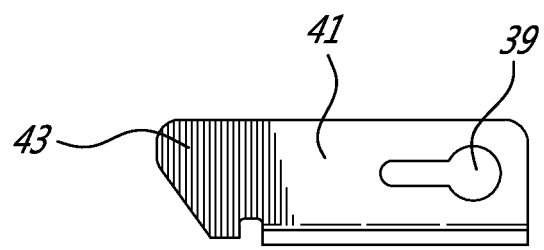

To close the door, each safety cable 36 secured to a corner member 22 is connected to a door glide 38 (FIG. 13*a*-13*b*). The glides 38 of the door panel 12 are aligned to respective notches 40 on the corner members 22 depending on the size of the frame (FIG. 13*c*) and engaged therein (FIG. 13*d*). Then the door panel is moved against the frame, thereby closing the access door. FIGS. 13*d* and 13*e* show views from inside of the wall, floor or ceiling once the door is thus closed.

In case of a metallic door panel, magnets 42 embedded in the corner members 22 as illustrated for example in FIG. 7 may further retain the door panel 12 in place for better stability. Other retaining elements between the frame members and the door panel may be contemplated depending on the different materials used and on the different requirements of a specific application.

The access door is now installed. It is a removable door which gives access to the interior of the panel.

For specific applications, such as an access door in a ceiling panel for example, securing means such as cables 36 allow further securing the access door once in place by catching the access door should it become dislodged from its opening for example.

To open the door, the door panel 12 is pulled outward, by inserting a fingernail or a small flat screwdriver into a corner of the door panel, which may be identified beforehand for simplicity purposes, since corners of the door panel located away from where the door panel is connected to a corner member of the frame by a glide on the inner side thereof, as described hereinabove, offer easier opening.

In case a locking mechanism as described hereinabove is used, a slotted or flat head screw driver may be used to lock or unlock the access door from the outside, to disengage the distal end 33 of the lock 30 from the frame 14 on the inner surface of the door panel inside the opening, as described hereinabove.

As people in the art will appreciate, the present access door is installed quickly, without specific tools, and easily by virtually anyone regardless of skill level.

The present access door is adjustable and may apply for a range of sizes. In the examples illustrated herein for way of examples, there are five different side dimensions, with five possible adjustments by an increment of ⅜". On the vertical and horizontal axes, for a given size of side members, the possible positions for an 8×9.5-inch frame are: 8, 8.375, 8.75, 9,125 and 9.5 inches (see embodiments illustrated in FIG. 9).

The invention was described hereinabove using positioning slots in sides of the frame and positioning pins in corners of the frame for adjustability of the size of the frame. Other controllable and reversible engagement mechanisms between sides and corners may be contemplated. Also, the sides, or the corners, may comprise telescopic parts, which length can be adjusted prior to, or after, connection between sides and corners.

As people in the art will now be in a position to appreciate, the present adjustable frame and access door allow overcoming obstacles that may be encountered in walls, ceilings or floors, such as, for example, posts and beams and pipes, and generally any space constraints. Moreover, the present adjustable frame allows accommodating a range of panel thickness.

Although the present invention has been described hereinabove by way of embodiments thereof, it may be modified, without departing from the nature and teachings of the subject invention as recited herein.

What is claimed is:

1. An access door adjustable to an opening having a size defined by a width and a height, comprising:
    a frame adjustable to the size of the opening; and
    a door panel, of a size at least the size of the opening;
    wherein said frame adjustable to the size of the opening comprises side members and corner members;
    each corner member comprising two arms, each arm comprising a receiving surface and a positioning pin extending perpendicularly from said receiving surface;
    each side member having a section adapted to receive an edge of the opening and comprising a first part adapted to lay flat on an outer surface of the edge of the opening and a second part extending within the opening along a surface generally perpendicular to said outer surface of the edge of the opening, said second part comprising engagement positions along a length thereof, said receiving surface of a corner member being adapted to align the first part of a side member with the corner member, said positioning pin of the corner members being adapted to connect by snapping, with one of the engagement positions of the side member, between a maximum length for each side of the frame, by using outermost engagement positions along the length of the side member on each side of the side member, and a minimum length for each side of the frame, by using innermost engagement positions on each side of the side member, to adjust to the size of the opening, thereby directly forming a frame adjusted to the width and the height of the opening and adapted to directly receive said door panel for closing said opening;
    and wherein said door panel comprises at least one glide on an inner surface thereof, said glide comprising a part rising from said inner surface of the door panel and having a distal end, and at least one corner member comprises a notch, said distal end being aligned with said notch and adapted to engage said notch of the corner member.

2. The access door of claim 1, wherein said second part of said side member comprises foldable tabs, said tabs being foldable, inside the opening, generally perpendicularly to said outer surface of the edge of the opening, thereby locking the frame into place within the opening.

3. The access door of claim 1, further comprising at least one cable connected between the corner member and said glide.

4. The access door of claim 1, wherein said door panel comprises a lock, said lock comprising a proximal end secured to an inner surface of the door panel and a distal end, and at least one side member comprises, on said second part extending within the opening along a surface generally perpendicular to said outer surface of the edge of the opening, a locking slot adapted to receive said distal end of the lock.

5. The access door of claim 4, wherein said lock comprises a slot at the distal end thereof and a series of holes along a length thereof, allowing different locations to adjust to the size of the frame, for securing the lock to the door panel by said proximal end of the lock so that the distal end of the lock is able to engage the locking slot of said second part of the side member.

6. The access door of claim 1, wherein said side members are metallic members and said corner members are plastic members.

7. The access door of claim 6, wherein said door panel is metallic and at least one corner member comprises an embedded magnet.

8. The access door of claim 1, wherein two consecutive of said side members are connected together by one of said corner members by selecting an engagement position of the side members for snapping with said positioning pin of the corner members.

9. The access door of claim 1, wherein the second part of at least one of the side members comprises at least one tab adapted to be foldable, outward of the opening, generally parallel to the outer surface of the edge of the opening.

10. The access door of claim 1, wherein at least one of i) said corner members and ii) said side members comprises telescopic parts.

11. The access door of claim 1, wherein the positioning pin comprises a detent.

12. An access door adjustable to an opening, in a wall, ceiling or floor panel, the opening having a size defined by a width and a height, comprising:
  a door panel, of a size at least the size of the opening, said door panel comprising at least one glide on an inner surface thereof, said glide comprising a part rising from said inner surface of the door panel and having a distal end;
  side members adjustable to the size of the opening, each side member comprising a first part adapted to lay flat on an outer surface of an edge of the opening and a second part adapted to extend within the opening along a surface generally perpendicular to said outer surface of the edge of the opening and comprising foldable tabs and positioning slots along a length thereof;
  corner members, each corner member comprising two arms, each arm comprising a receiving surface and a positioning in extending perpendicularly from said receiving surface, and at least one corner member comprising a notch;
  wherein the receiving surface is adapted to align the first part of a side member with the corner member; the positioning pin is adapted to connect by snapping with one of the positioning slots of the side member between i) a maximum length for each side of the frame by using an outermost positioning slot along the length of the side member on each side of the side member, and ii) a minimum length for each side of the frame by using an innermost positioning slot on each side of the side member to adjust to the size of the opening,-thereby forming a frame adjusted to the width and the height of the opening; the foldable tabs being adapted to fold inside the opening, behind the wall, ceiling or floor panel, and said distal end of said glide being aligned with said notch and adapted to engage said notch of the corner member to secure said door panel over said opening.

* * * * *